United States Patent
Fleck et al.

(10) Patent No.: US 11,949,138 B2
(45) Date of Patent: Apr. 2, 2024

(54) REDOX FLOW BATTERY AND METHOD FOR PRODUCING A GUIDE STRUCTURE OF AN ELECTRODE ELEMENT OF A REDOX FLOW BATTERY

(71) Applicant: Siemens Aktiengesellschaft, Munich (DE)

(72) Inventors: Robert Fleck, Adelsdorf (DE); Barbara Schricker, Erlangen (DE); Holger Wolfschmidt, Erlangen (DE)

(73) Assignee: LITRICITY GMBH, Rosenheim (DE)

( * ) Notice: Subject to any disclaimer, the term of this patent is extended or adjusted under 35 U.S.C. 154(b) by 826 days.

(21) Appl. No.: 16/975,623

(22) PCT Filed: Feb. 21, 2019

(86) PCT No.: PCT/EP2019/054335
§ 371 (c)(1),
(2) Date: Aug. 25, 2020

(87) PCT Pub. No.: WO2019/166324
PCT Pub. Date: Sep. 6, 2019

(65) Prior Publication Data
US 2020/0411893 A1 Dec. 31, 2020

(30) Foreign Application Priority Data
Feb. 28, 2018 (EP) ..................... 18159038

(51) Int. Cl.
*H01M 8/18* (2006.01)
*H01M 8/04276* (2016.01)
*H01M 8/1004* (2016.01)

(52) U.S. Cl.
CPC ....... *H01M 8/188* (2013.01); *H01M 8/04283* (2013.01); *H01M 8/1004* (2013.01)

(58) Field of Classification Search
CPC . H01M 8/188; H01M 8/04283; H01M 8/1004
See application file for complete search history.

(56) References Cited

U.S. PATENT DOCUMENTS

| 9,166,243 B2 | 10/2015 | Perry | |
| 2013/0022846 A1* | 1/2013 | Liu | ........... H01M 4/96 429/81 |
| 2018/0159163 A1* | 6/2018 | Hanafusa | ................ H01M 8/18 |

FOREIGN PATENT DOCUMENTS

| DE | 10 2008 033 210 | 1/2010 | .............. H01M 8/02 |
| EP | 2 221 908 | 8/2010 | .............. H01M 8/24 |
| JP | H09 245820 | 9/1997 | .............. H01M 8/02 |

OTHER PUBLICATIONS

Search Report for International Application No. PCT/EP2019/054335, 11 pages, dated May 16, 2019.

* cited by examiner

*Primary Examiner* — Adam A Arciero
(74) *Attorney, Agent, or Firm* — Slayden Grubert Beard PLLC

(57) ABSTRACT

Various embodiments include a redox flow battery comprising: a cell divided into half-cells by a membrane; an electrolyte able to flow through the interior of the respective half-cell; an electrode; and a guide structure for guiding the electrolyte integrated into and defined by the associated electrode. Each half-cell comprises a current collector and an electrode element arranged in an interior of the respective half-cell.

22 Claims, 5 Drawing Sheets

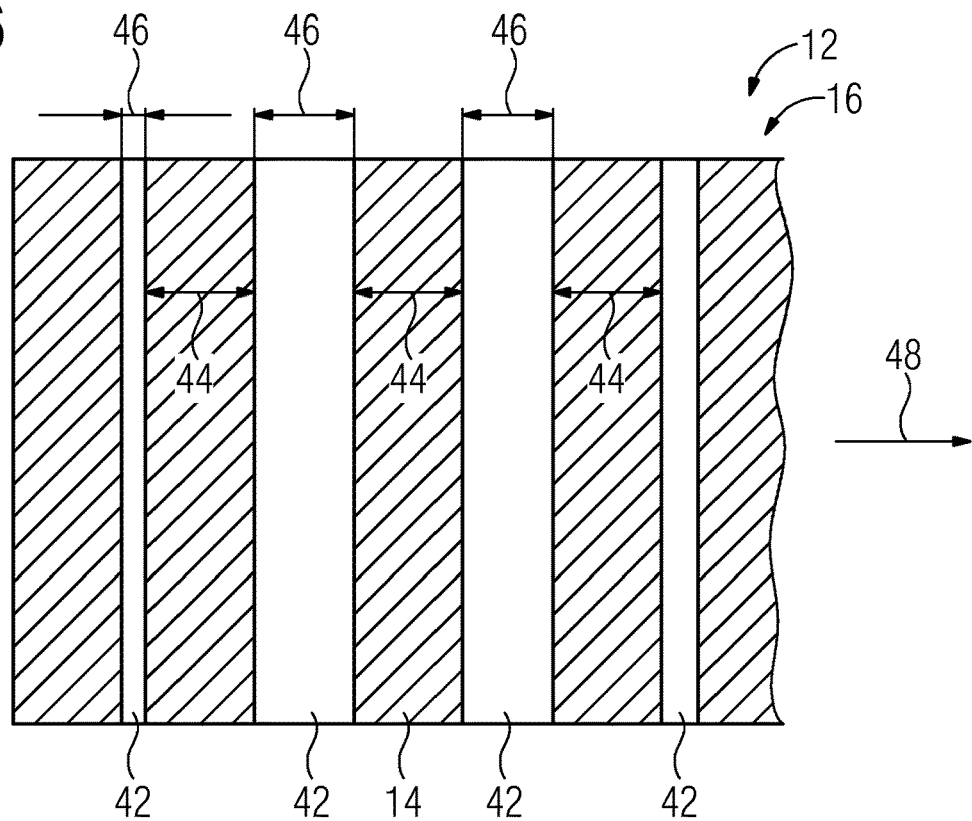
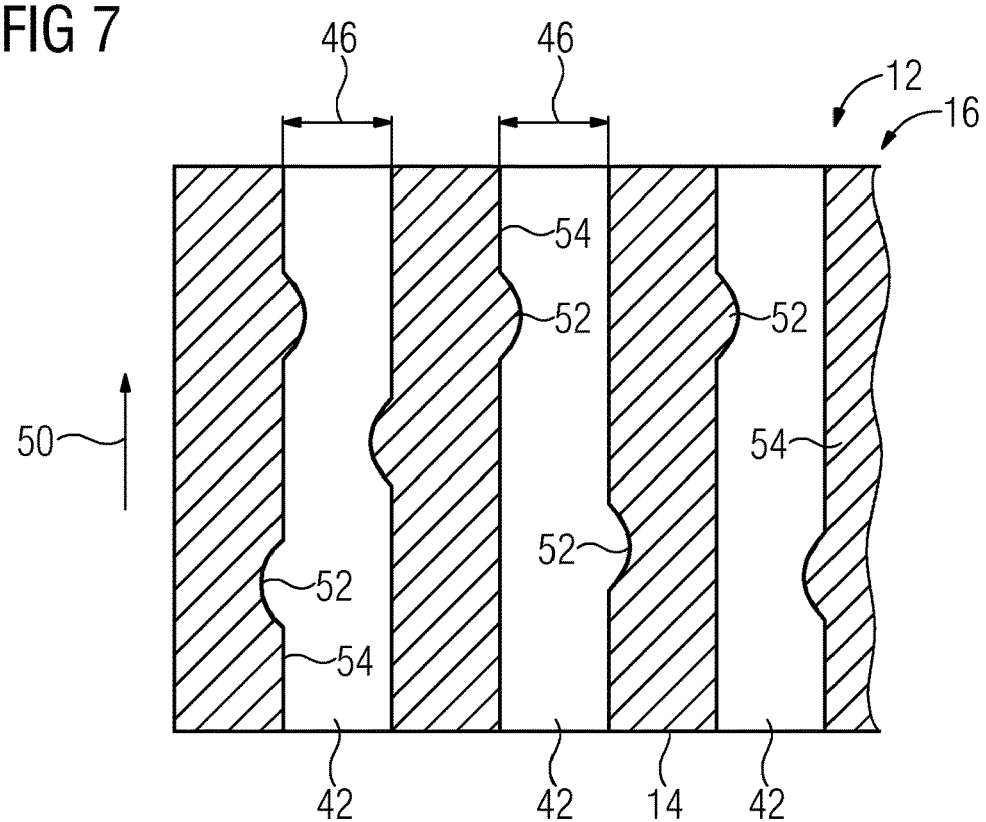

tran 0 1 0 1

REDOX FLOW BATTERY AND METHOD FOR PRODUCING A GUIDE STRUCTURE OF AN ELECTRODE ELEMENT OF A REDOX FLOW BATTERY

CROSS-REFERENCE TO RELATED APPLICATIONS

This application is a U.S. National Stage Application of International Application No. PCT/EP2019/054335 filed Feb. 21, 2019, which designates the United States of America, and claims priority to EP Application No. 18159038.1 filed Feb. 28, 2018, the contents of which are hereby incorporated by reference in their entirety.

TECHNICAL FIELD

The present disclosure relates to redox flow batteries. Various embodiments include batteries and/or methods for producing at least one guide structure of an electrode element of a redox flow battery.

BACKGROUND

A redox flow battery, which is also referred to as a liquid battery or a wet cell, is one embodiment of an accumulator. The redox flow battery may in the future become highly important in the storage of electrical energy from renewable energy sources, since it is able to store fluctuating energies such as solar and/or wind energy and release them again when required. One feature that characterizes the redox flow battery is that the chemical energy is not stored in a solid, as is usual, but in a liquid electrolyte. This is generally stored in two separate tanks and may, when required, be converted in a cell of the redox flow battery. There are two electrodes, an anode and a cathode, inside the cell. An ion-conducting membrane separates or divides the cell into two half-cells, a respective electrode in this case being arranged in a respective one of the half-cells.

One type of redox flow battery that is commonly used is the vanadium redox flow battery, in which both electrolytes, that is to say the electrolyte that flows past an anode and the electrolyte that flows past a cathode, contain vanadium compounds. When the redox flow battery discharges, the following oxidation then takes place at the anode: $V^{2+} \leftrightarrow V^{3+} + e^{-}$. The following reduction takes place at the cathode during discharge: $VO_2^+ + 2H^+ + e^- \leftrightarrow VO^{2+} + H_2O$. Electrons are made available at the anode, which the cathode absorbs, causing a current to flow between the two electrodes. Due to the respective electrode reaction, a charge imbalance arises between the two half-cells, for which reason a charge exchange through the membrane has to take place. This reaction is reversible in the redox flow reaction, such that the redox flow battery is able to be recharged. Such a redox flow battery generally comprises not only one cell, but rather a plurality of cells are stacked to form what is known as a stack, as a result of which for example it is possible to achieve a multiple of the power.

One advantage of redox flow batteries is that their storage capacity may be optimized independently of their electric power. The storage capacity thus depends primarily on the size of the electrolyte tanks. The electric power, that is to say the amount of electrical energy per unit of time, may be improved in various ways. By way of example, this may be achieved by optimizing the electrodes, the membrane or the electrolyte(s) and the size of the stack.

By way of example, the electrode should have high chemical and mechanical stability. It should additionally have a particularly high conductivity and a particularly large active surface. The main function of the membrane is that of charge balancing, that is to say the exchange of in particular selectable ions. In this case, however, mixing of the electrolyte that flows through the respective half-cell with the respective other electrolyte is undesirable. The membrane should in this case also be chemically stable and have a low resistance. For the electrolyte, a particularly high solubility of ions may for example be advantageous.

One disadvantage of redox flow batteries is the occurrence of high electrical and/or ionic resistances, which may lead to losses. Restricted reaction kinetics or high diffusion resistances may furthermore likewise lead to losses. A voltage efficiency may be influenced for example by loss of polarization, in particular during a charging cycle. Diffusion resistances arise for example from the fact that electrons may be rearranged at the triple-phase boundary through diffusion processes. Therefore, a concentration that is as far as possible identical of for example ions and/or electrons should be present in the electrolyte within the entire cell or half-cell, that is to say the electrolyte should be particularly homogeneous. In order to reduce concentration-dependent losses, the volume flow of the electrolyte across the cell may be increased, inter alia. This may however lead to an increase in hydrodynamic pressure losses in the cell.

Said losses may all occur simultaneously in the electrode or at interfaces between the electrode and the electrolyte in the redox flow battery. In conventional redox flow batteries, the electrolyte is pumped to or through the electrode by way of what is known as a flow field. In this case, the flow field forms a guide structure that is arranged on the electrode as part of an electrode element, but separately therefrom.

U.S. Pat. No. 9,166,243 B2 describes a flow battery that comprises a first liquid-porous electrode, a second liquid-porous electrode, which is spaced from the first liquid-porous electrode, and an ion exchange membrane. The ion exchange membrane is arranged between the first electrode and the second electrode. A first and a second flow field are arranged adjacent to the respective first electrode and the second electrode, wherein the flow fields have channels with at least partially blocked inlets and outlets.

U.S. Pat. No. 8,808,897 B2 describes an electrode structure of a vanadium redox flow battery that has a proton exchange membrane, two graphite papers, two graphite felt units, two platelets, two graphite plates, two metal plates and a locking fastening device.

SUMMARY

The teachings of the present disclosure include redox flow batteries in which the electrolyte is able to be channeled to the electrode or through the electrode in a particularly advantageous manner. For example, some embodiments include a redox flow battery (10) having at least one cell (18) that is divided into half-cells (22) by a membrane (20), which half-cells each comprise a current collector (24) and an electrode element (12) that is arranged in an interior (28), through which an electrolyte (26) is able to flow, of the respective half-cell (22) and that has an electrode (14) and a guide structure (16), characterized in that the guide structure (16) for guiding the electrolyte (26) is integrated into the associated electrode (14).

In some embodiments, the electrode (14) is designed as a nonwoven and/or paper and/or foam and/or mesh and/or braid and/or felt and/or sponge, into (each of) which the guide structure (16) is integrated.

In some embodiments, the guide structure (16) is formed by different density regions (38) of the electrode (14).

In some embodiments, the respective density region (38) of the electrode (14) is stitched.

In some embodiments, by virtue of a shaped structure (40) of the current collector (24) that is in contact with the electrode (14), the density regions (38) in the electrode (14) are embossed by way of the shaped structure (40).

In some embodiments, the guide structure (16) comprises a channel (42) that has an angular and/or round cross section.

In some embodiments, the cross-sectional area (46) of the channel (42), which is perpendicular to the direction of longitudinal extent (50) of the channel (42), along the direction of longitudinal extent (50), in particular continuously, has a changed size and/or at least one shaped element (52) is arranged on a channel wall (54) and reduces or increases the cross-sectional area (46) in at least a subregion of the channel (42).

In some embodiments, at least one boundary surface of the channel (42) is at least partially congruent with a subregion of a surface of the electrode (14).

In some embodiments, the guide structure (16) comprises a plurality of channels (42), wherein the channels (42) are aligned substantially parallel to one another.

In some embodiments, adjacent channels (42) each have a different cross-sectional area (46), wherein the cross-sectional area of adjacent channels (42) are in a predefinable ratio with respect to one another.

In some embodiments, adjacent channels (42) are each arranged at the same distance (44) from one another.

In some embodiments, the distance (44) between respective adjacent channels (42) increases or decreases in a preferred direction of the electrode (14).

In some embodiments, a plurality of channels (42) are arranged in a meandering manner with respect to one another and are at least partially connected directly to one another.

In some embodiments, the guide structure (16) has at least one diffuser, by way of which the electrolyte (26) is able to be channeled to or from the electrode (14).

As another example, some embodiments include a method for producing at least one guide structure of an electrode element of a redox flow battery (10), which has an electrode (14) and the guide structure (16) for guiding an electrolyte (26), characterized in that the guide structure (16) is integrated into the electrode (14) by way of additive manufacturing of the electrode (14) and/or by casting the electrode (14) with inserts and then burning out the inserts and/or by pressing the guide structure (16) into the electrode (14).

BRIEF DESCRIPTION OF THE DRAWINGS

Exemplary embodiments of the teachings herein are explained in more detail below with reference to schematic drawings, in which:

FIG. 6 shows a schematic illustration of a fifth electrode element incorporating teachings of the present disclosure having the channels;

FIG. 7 shows a schematic illustration of a sixth electrode element incorporating teachings of the present disclosure having channels with different cross-sectional areas;

DETAILED DESCRIPTION

Figure 1:
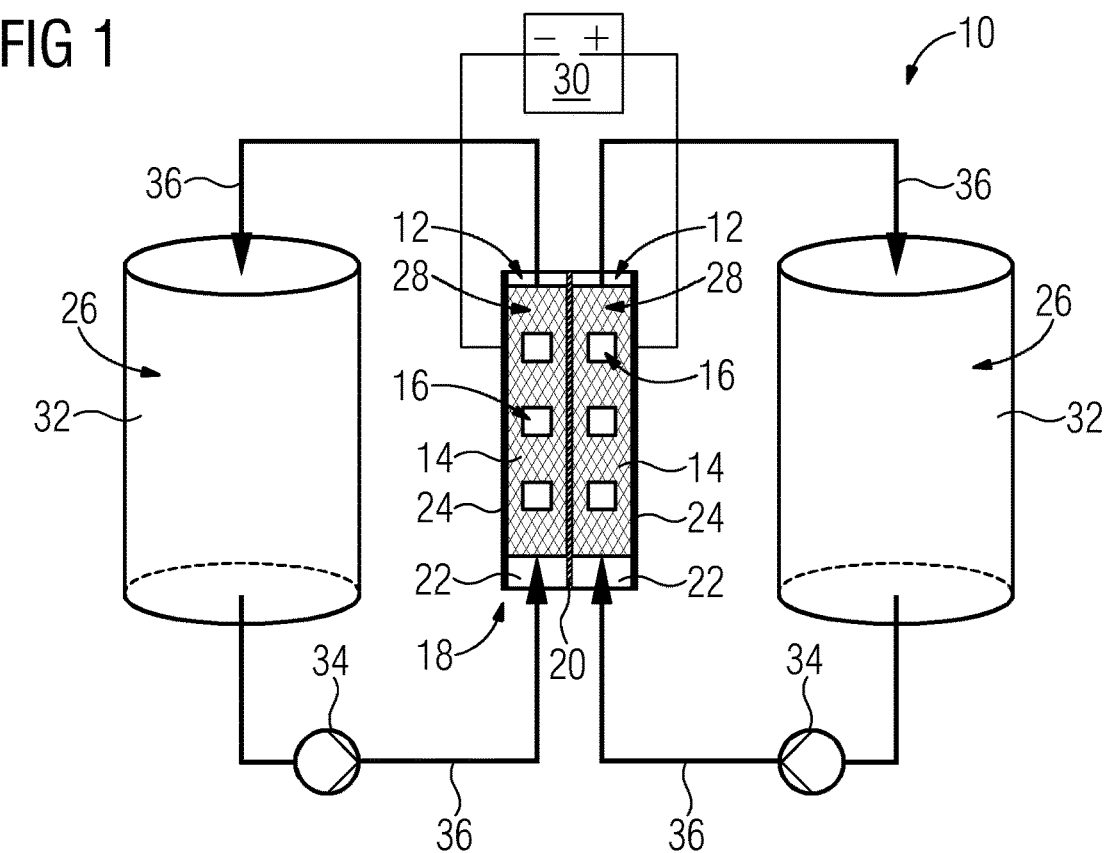
FIG. 1 shows a schematic illustration of a redox flow battery incorporating teachings of the present disclosure having an electrode element having an electrode and a guide structure.

In some embodiments, there is a redox flow battery having at least one cell that is divided into half-cells by a membrane. The respective half-cell comprises a current collector and an electrode element that is arranged in an interior, through which an electrolyte is able to flow, of the respective half-cell and that has an electrode and a guide structure. The electrolyte may be pumped or conveyed into or through the respective half-cell by way of a pump, such that the electrolyte is able to flow through the half-cell.

In order then to channel or to convey the electrolyte to or through the electrode, the guide structure for guiding the electrolyte is integrated into the associated electrode. In some embodiments, in the case of electrolytes whose redox pairs have particularly fast reaction kinetics, losses due to diffusion overvoltages may dominate. Existing previous concepts for the flow of electrolytes through the cell in this case prove to be inadequate. In the prior art, for example, the electrolyte is pumped directly through the electrode, on the one hand, or the electrolyte is pumped past the electrode in channels. Reference is made here to a flow-through structure, on the one hand, and a flow-by structure, on the other hand.

In some embodiments of the teachings herein, the guide structure is formed together with the electrode, e.g. integrally and internally. In some embodiments, the contact resistances caused by the separation of the guide structure and the electrode and a resultant voltage drop, which may lead to losses, do not occur. It is furthermore possible to mix the electrolyte, such that diffusion resistances are particularly low. This is supported by hydrodynamic calculations and series of tests, which are also in accordance with simulation models of a networked resistance network that are performed in analogy.

In some embodiments, the electrode comprises a nonwoven and/or paper and/or foam and/or mesh and/or braid and/or felt and/or sponge, into (each of) which the guide structure is integrated. The electrode may thereby or thus be designed to be particularly consistent for the electrolyte. A particularly high conductivity with at the same time a particularly high active surface may furthermore thereby be formed. A reduction or oxidation in the redox flow battery takes place at what is known as the triple-phase boundary. The larger, therefore, an active surface in the electrode, for example due to the porosity of the material forming the electrode, the better the reduction or oxidation is thus able to take place. Furthermore, using a nonwoven and/or paper and/or foam and/or mesh and/or braid and/or felt and/or sponge as the basic structure of the electrode allows particularly good distribution of the liquid electrolyte in the electrode. Graphite may be used as the material of the basic structure and thus of the electrode, such that the electrode is able to be designed to be particularly flexible and particularly porous in terms of its morphology.

In some embodiments, the guide structure is formed by different density regions of the electrode. In other words, the electrode, which may be nonwoven, has a plurality of density regions, that is to say regions of different density. Adjacent density regions in this case each have a different density from one another. Simulation calculations indicate that the density regions may be arranged asymmetrically with respect to one another in order to promote a distribution of the electrolyte in the electrode. The respective density may in this case be influenced in particular by the porosity or fiber structure of the material of the electrode. By virtue of the different density regions, the electrolyte or the electrolytes may be channeled in a targeted manner to a reaction surface, which is in particular the active surface, formed for example by pores, of the electrode. Pressure losses and losses due to diffusion polarization may furthermore be kept particularly low. Turbulence and/or homogenization of the electrolyte may furthermore take place through the density regions. By virtue of forming different density regions in the electrode, the redox flow battery may furthermore be operated with electrolytes that have particularly fast reaction kinetics. Said advantages furthermore also result for redox flow batteries having conventional electrolytes, such as for example vanadium.

In some embodiments, the respective density region of the electrode is stitched. In other words, a respective density region is formed by stitching in the porous, in particular fiber-structured, material of the electrode, in particular the nonwoven and/or paper and/or another of the abovementioned basic structures, for example by way of a fiber and/or a thread. By virtue of stitching the density regions, the redox flow battery is able to be operated with a particularly long service life, since the density regions are able to be designed or are designed to be particularly stable due to the stitching. The costs of the redox flow battery are furthermore able to be kept particularly low, for example, by virtue of the stitching.

In some embodiments, the density regions in the electrode are embossed by way of a shaped structure of the current collector that is in contact with the electrode. In other words, the current collector has an in particular three-dimensional structure on at least one of its outer circumferential sides or outer surface. This structure forms the shaped structure and, in an assembled state of the redox flow battery, presses as a negative as it were onto the electrode in contact therewith, such that different density regions are formed in the respective electrode by pressing. The respective density regions may thus be designed to have a particularly long service life and/or costs are able to be kept low.

In some embodiments, the guide structure comprises a channel that has an angular and/or round cross section. In other words, a channel is integrated or introduced into the electrode, through which channel in particular the electrolyte may flow or is able to flow. An interior of the channel is in particular free from the material from which the electrode is formed, that is to say the electrode material. The surface perpendicular to the direction of longitudinal extent of the channel has an angular and/or round base surface. In the case of an angular cross section, the cross-sectional area may in this case be a regular or irregular polygon. If the cross section is round, the cross-sectional area may be designed to be both circular and for example elliptical. By virtue of the channel in the guide structure, the electrolyte may be able to be channeled through the electrode and also distributed therein.

In some embodiments, the cross-sectional area of the channel, which is perpendicular to the longitudinal extent of the channel, has an in particular constantly changing size along this direction of longitudinal extent. In some embodiments, a shaped element is arranged on a channel wall and reduces or increases the cross-sectional area in at least a subregion of the channel. In other words, the channel may be designed such that it changes or is able to change its cross-sectional area along its course, that is to say that the cross-sectional area may widen or narrow along the flow direction of the electrolyte through the channel. In some embodiments, the cross-sectional area first increases and then decreases so as to then increase again, or vice versa, as seen in the flow direction. The at least one shaped element additionally formed on the channel wall may be for example a concave bulge or a convex indentation, such that the shaped element is likewise designed to at least partially change the cross-sectional area of the channel. By virtue of changing the cross-sectional area of the channel, the pressure of the electrolyte flowing through the channel is able to be changed such that for example the electrolyte is subjected to turbulence in the channel, which may lead to mixing or circulation in the electrolyte, as a result of which for example the ions of the electrolyte may particularly advantageously be released or absorbed at the electrode.

In some embodiments, at least one boundary surface of the channel, which may in particular be part of the channel wall, is at least partially congruent with a subregion of a surface, in particular an outer surface, of the electrode. In other words, the channel and the electrode share a common boundary, for example with respect to the current collector. It is thereby possible for example to design the channel to be particularly large, such that it is able for example to completely penetrate the electrode at least in a subregion. The electrolyte is able for example to be channeled or guided to individual regions of the electrode.

In some embodiments, the guide structure comprises a plurality of channels, wherein the channels are aligned substantially parallel to one another. That is to say that the respective direction of longitudinal extent of a respective channel is substantially parallel to the directions of longitudinal extent of the at least one other channel. In this case, substantially parallel should be understood to mean that the direction of longitudinal extent of one channel is offset at most by a small angle with respect to another direction of longitudinal extent, such that for example the directions of longitudinal extent of the channels are oriented overall for example along the direction of longitudinal extent of the electrode. By virtue of forming a plurality of channels, the electrode, in particular special subregions of the electrode, may be reached by the electrolyte, which is in particular pumped or conveyed into the half-cell, such that for example the inner surface or reaction surface of the electrode is able to be used particularly efficiently for at least part of the reaction. The entire volume of the electrode is thereby particularly able to be used efficiently for current generation.

In some embodiments, channels that are adjacent to one another each have a different cross-sectional area, wherein the cross-sectional areas of adjacent channels are in a predefinable ratio with respect to one another. In other words, if a first channel has a first cross-sectional area and a second channel adjacent to the first channel has a second cross-sectional area, the first cross-sectional area is different from the second cross-sectional area. A third channel adjacent to the second channel has a third cross-sectional area that is different from the second cross-sectional area. The third cross-sectional area may in this case be the same as the first cross-sectional area or different from the first cross-sectional area. The predefinable ratio should be understood to mean that the respective cross-sectional area of the respective channel and the respective adjacent channel have a specific, advantageous ratio with respect to one another.

Simulation calculations have thus shown that it may be advantageous for example if the first cross-sectional area corresponds to a value of 1, the second cross-sectional area has a value of 2, for example, and the third cross-sectional area has a value of 3. The predefinable or predefined ratio would thus be 1:2:3. A channel width, for example in the case of an angular channel cross-sectional area, or the channel diameter in the case of a round channel cross-sectional area, may thus have a fixed ratio from one channel to the other. The electrolyte is able to be distributed in the electrode by virtue of said different cross-sectional areas of the in particular adjacent channels with respect to one another.

In some embodiments, adjacent channels are each arranged at the same distance from one another. That is to say, if a first channel is at a first distance from a second channel, then the distance between the second and a third channel is equal to the first distance if the first and the second channel and the second and the third channel are each adjacent. Adjacent should be understood to mean that no further channel is arranged in each case between the first and second channel and between the second and third channel. The electrode is able to be supplied uniformly with the electrolyte by virtue of the in each case equal distances between the adjacent channels.

In some embodiments, the distance between respectively adjacent channels increases or decreases in a preferred direction of the electrode. In other words, the distance between respectively adjacent channels increases in a preferred direction, or the distance along the preferred direction between respectively adjacent channels becomes smaller.

That is to say, if the channels are arranged for example parallel to the direction of longitudinal extent of the electrode, then a distance between the channels in a transverse direction of the electrode, perpendicular to the direction of longitudinal extent, between a first channel and a second channel adjacent to the first channel is a first distance, whereas the distance between a second channel and a third channel that is adjacent to the second channel and not adjacent to the first channel is a second distance that is greater than the first distance. A fourth channel, which is adjacent to the third channel in the preferred direction, has a third distance from the third channel that is greater than the second distance. Any point of the electrode may in this case be selected as the starting point for the preferred direction, such that for example the distance increases or decreases in the transverse direction of the electrode starting from the center toward one respective end and toward another respective end of the electrode in the transverse direction. By virtue of the different distances between the channels, in particular depending on how the electrolyte is introduced into the half-cell, the electrolyte may particularly advantageously be channeled to or through the electrode.

In some embodiments, a plurality of channels are arranged in a meandering manner with respect to one another and at least partially connected directly to one another. That is to say that there is no preferred relationship between a direction of longitudinal extent of a respective channel and the direction of longitudinal extent of the electrode, such that for example a first channel may be perpendicular to a second channel. As an alternative or in addition, the direction of longitudinal extent of a first channel may run obliquely to the direction of longitudinal extent of a further channel. The individual channels of the guide structure may in this case be arranged with respect to one another or have a propagation such that at least two channels intersect in at least one subregion along their direction of propagation and are thus in particular connected to one another in a particularly fluidically conductive manner. By virtue of the meandering arrangement of the channels in the guide structure, the electrolyte may be able to be conveyed or be conveyed through the electrode.

In some embodiments, the guide structure has at least one diffuser, by way of which the electrolyte is able to be channeled to the electrode or away from the electrode. The at least one diffuser may steer or channel the electrolyte such that the electrolyte is able to be channeled through the electrode by way of the guide structure or, after passing through the electrode, may for example be combined to form a flow such that the electrolyte is able to flow through the half-cell in a particularly efficient manner.

In some embodiments, there is a method for producing at least one guide structure of an electrode element of a redox flow battery. The electrode element in this case has an electrode and the guide structure for guiding an electrolyte. In order to produce the guide structure according to the invention and thereby to obtain a redox flow battery through which the electrolyte is able to be guided, in particular through the respective half-cell and thus the electrode, the electrode is produced according to the invention by way of additive manufacturing. In some embodiments, the guide structure may be formed by casting the electrode with inserts and then burning out the inserts, such that the guide structure is able to be integrated into the electrode in a particularly advantageous manner.

In some embodiments, the method may be used to integrate the guide structure in the electrode by pressing the guide structure into the electrode. It is thus possible for example to form the guide structure by way of a 3D printing method, as a result of which the guide structure in the electrode may be designed in virtually any configuration and adapted to the respective requirements of the electrolyte. The simulation by way of said resistor network may in this case be used to suitably determine the 3D structure. By virtue of casting and then burning out the structures, which may be applied in particular for the channels in the guide structure, these channels are able to be formed particularly precisely, as a result of which the guide structure may channel the electrolyte during subsequent operation of the redox flow battery. By virtue of pressing the guide structure, in particular the channels, into the electrolyte, and in particular subsequently fastening the structure, for example likewise by stitching, as may be used to form the density regions, the guide structure is able to be produced for example in a particularly cost-effective manner. The nonwoven or else said other basic structures of the electrolyte may furthermore in particular be produced through one of said production types.

Advantages and advantageous refinements of any embodiments described should be regarded as advantages and advantageous refinements of the alternative embodiments, and vice versa.

FIG. 1 shows a schematic illustration of a redox flow battery 10 having an electrode element 12 having an electrode 14 and a guide structure 16. The redox flow battery 10 in this case has at least one cell 18 that is divided into half-cells 22 by a membrane 20. A respective electrode element 12 and a respective current collector 24 are arranged in this case in each of the half-cells 22. The respective electrode element 12 is arranged in an interior 28, able to be flowed through by an electrolyte 26, of the respective half-cell 22 and comprises the electrode 14 and the guide structure 16. The current collectors 24 serve to tap the electric current flowing in the cell 18 between the half-cells 22 in order to make it available to a consumer 30, for example. On the other hand, the redox flow battery 10 may be charged via the current collectors 24 if for example it is not intended to be an option to exchange the electrolytes 26 in order to charge the redox flow battery 10.

The redox flow battery 10 furthermore has tanks 32, in each of which the electrolyte 26 for a half-cell 22 is able to be stored. The respective electrolyte 26 may be conveyed into the respective half-cell 22 via a line 36 by way of a pump device 34. The electrolyte 26 is conveyed through the respective interior 28 of the cell and in the process flows through or past the electrode 14. The electrolyte 26 is in this case for example positively charged in one of the half-cells 22 and for example negatively charged in the other half-cell 22, such that there may be an exchange of charge carriers across the membrane 20, which is in particular an ion exchange membrane, as a result of which current is able to be tapped at the current collectors 24, for example for the consumer 30. The electrolyte 26 then flows onward through the respective half-cell 22 and out thereof and is conveyed back to the tank 32.

During operation of a redox flow battery 10, losses may occur, which could for example reduce the electrical efficiency or voltage. These losses may thus occur at different points in the redox flow battery 10 and have different causes. By way of example, high electrical or ionic resistances or restricted reaction kinetics or high diffusion resistances may occur. There may additionally be concentration-dependent losses, inter alia, in a volume flow of the electrolyte 26.

In order to keep the losses particularly low and to channel the electrolyte 26 to the electrode 14 or through the electrode 14 or to allow it to flow through the electrode 14, the guide structure for guiding the electrolyte 26 is integrated into the respectively associated electrode 14. The electrode 14 comprises a nonwoven and/or paper and/or foam and/or mesh and/or braid and/or felt and/or sponge. In some embodiments, the electrode 14 is formed from at least one in particular flexible porous material or the electrode 14 has a porous basic structure, wherein the material, in particular depending on the electrolyte 26 that is used, may in particular contain carbon. The guide structure 16 is thus integrated into a nonwoven and/or paper and/or foam and/or mesh and/or braid and/or felt and/or sponge.

If the guide structure 16 in the electrode 14 is dispensed with, as is the case in the prior art, it is not possible to achieve an optimum distribution of the electrolyte 26. This would result in an inhomogenized distribution of electrolyte flows along the membrane 20 and, when charging or discharging the cell 18, lead to differences in the concentration of the electrolyte 26 in its carrier fluid and thus ultimately to increased diffusion losses.

Figure 2:
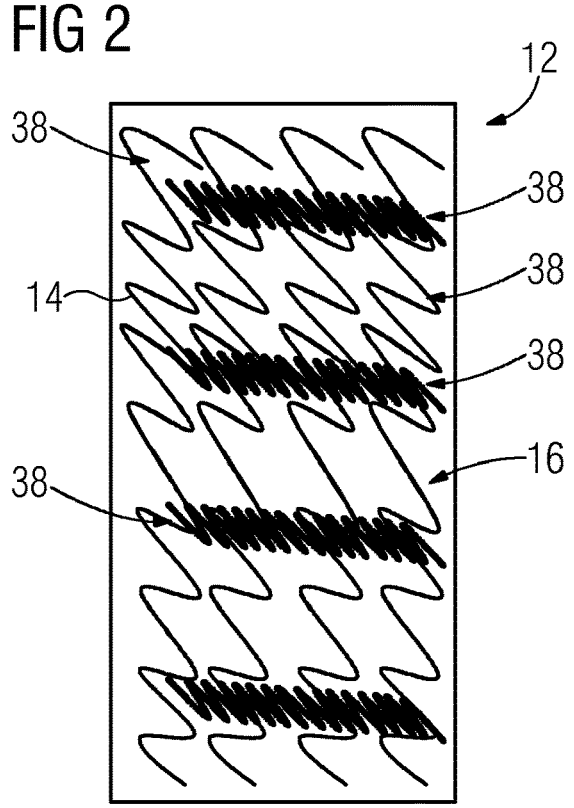
FIG. 2 shows a schematic illustration of a first electrode element incorporating teachings of the present disclosure with different density regions in the electrode.

FIG. 2 shows a schematic illustration of a first electrode element 12 with different density regions 38 in the electrode 14. By virtue of forming different density regions 38 in the electrode 14, which is designed for example as a nonwoven, wherein adjacent density regions 38 each have a different density from one another, it is possible for example for the electrolyte 26 to be subjected to turbulence and/or homogenized in the electrode 14. The electrolyte 26 may thus for example be homogenized such that there may be a particularly uniform distribution of ions in the electrolyte 26, as a result of which a reduction or oxidation is able to take place as far as possible everywhere on the large inner surface provided by the porosity of the electrode 14. Diffusion voltages or polarization losses are thereby particularly low.

Figure 3:
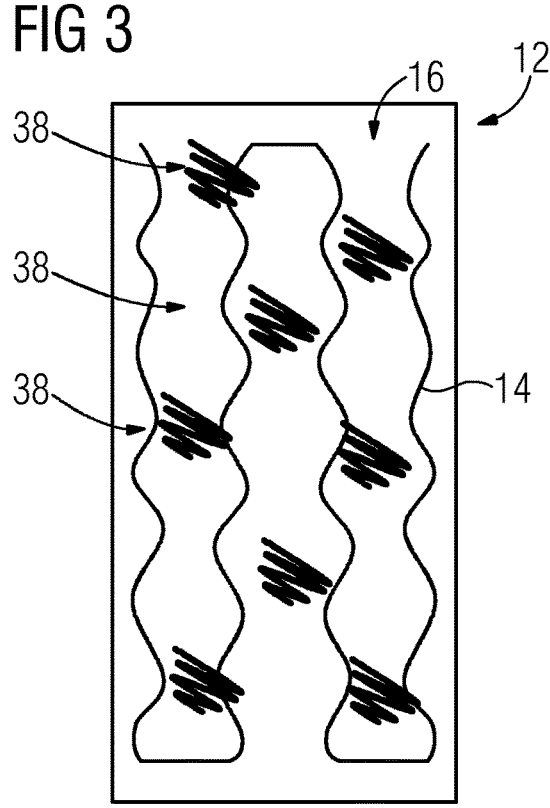
FIG. 3 shows a schematic illustration of a second electrode element incorporating teachings of the present disclosure with different density regions in the electrode.

FIG. 3 shows a schematic illustration of a second electrode element 12 with an alternative arrangement of different density regions 38 in the electrode 14. The respective density region 38 of the electrode 14 is stitched, as a result of which it is particularly dimensionally stable and thereby designed to have a long service life. By virtue of various simulation calculations, in particular of a resistor network, one of which is shown as an example in FIG. 9, it has proven that, depending on the electrolyte 26 that is used and the distribution of an active species, which is for example the reduction agent, an asymmetrical structure for example of the density regions 38 in the guide structure 16.

Depending on the electrolyte 26 that is used, which may comprise for example vanadium or a polymer, a symmetrical structure of the guide structure 16, as shown in FIG. 3, may be the case. The electrolyte 26 may be channeled to the electrode element 12 via a diffuser that is not shown. In some embodiments, the density regions 38 that are shown by way of example, this diffuser may form a further part of the guide structure 16. The electrolyte flow of the electrolyte 26 may thereby for example be changed by the diffuser or a diffuser device such that better mixing of the electrolyte 26 is able to be made possible, as a result of which diffusion losses are able to be kept particularly low.

The electrolyte 26 may be channeled in a targeted manner to the at least one reaction surface through the density regions 38 of the thus density-variable electrode 14, which may in particular have a basic structure of a nonwoven. A triple-phase boundary may be considered to be a reaction surface, which may be a region on the electrode 14 at which at least part of the redox reaction for generating current in the redox flow battery 10 may take place. Furthermore, by virtue of the variation in density of the guide structure 16 in the electrode 14, pressure losses are able to be kept particularly low and, in addition or as an alternative, diffusion polarization is able to be kept particularly low. One possibility for creating the density regions is that of stitching, such that the density-variable electrode 14 or a material used for the electrode 14 may already have the guide structure 16 when it is produced. One alternative thereto is shown in FIG. 4.

Figure 4:
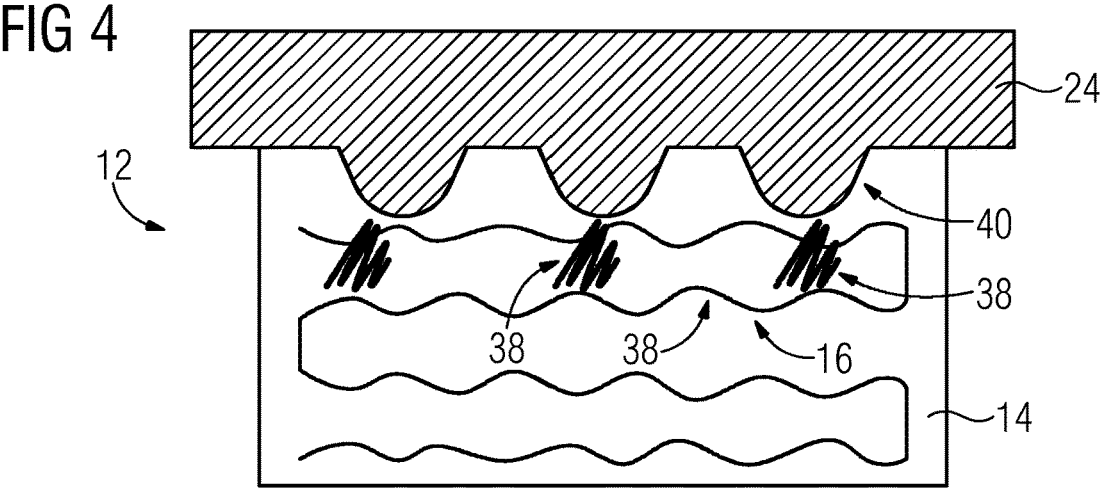
FIG. 4 shows a schematic illustration of a third electrode element incorporating teachings of the present disclosure with different density regions in the electrode, which are embossed by a current collector.

FIG. 4 shows a schematic illustration of a third electrode element 12 with different density regions 38 in the electrode 14, wherein the density regions 38 are embossed into the electrode 14 by the current collector 24. To this end, the current collector 24 has a shaped structure 40. The shaped structure 40 may be formed for example from a three-dimensional relief that is located on a surface, facing the electrode 14, of the current collector 24 or is arranged thereon. Thus, at least for part of the guide structure 16, in the case of pressing during installation into the redox flow battery 10 in an electrode material from which the electrode is formed and that has a homogeneous density, the current collector 24 may be used to achieve a different pressing density through the pressing. As a result, in the redox flow battery 10, the guide structure 16 may be integrated or is integrated in the electrode 14 in a dimensionally stable manner.

Figure 5:
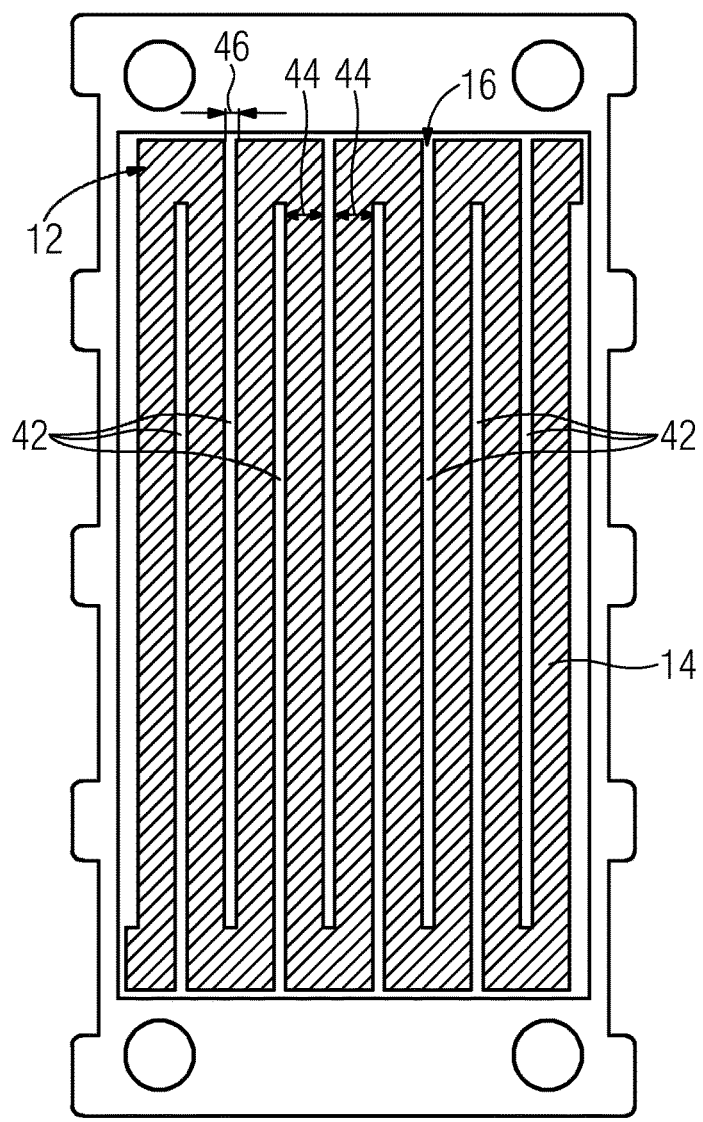
FIG. 5 shows a schematic illustration of a fourth electrode element incorporating teachings of the present disclosure having substantially parallel channels.

FIG. 5 shows a schematic illustration of a fourth electrode element 12 having essentially parallel channels 42. The guide structure 16 may comprise at least one channel 42, which has an angular and/or round cross section. In this case, at least one boundary surface of the channel 42 may be formed at least partially congruent with a subregion of a surface, in particular the outer, outer-circumferential surface, of the electrode 14. By virtue of the channels 42 incorporated into the electrode 14, the electrode element 12 may be designed integrally, in particular in comparison with the prior art. The outer surface is in this case not the inner surface, which is provided by the porosity of the electrode material, but rather the outer surface is the surface that delimits the geometric shape of the electrode 14 from an environment.

The electrolyte 26 to be conveyed through the electrode 14 experiences a particularly low flow resistance through the channels 42. It is thereby able to be transported to a respective reaction surface of the electrode 14. Due to the porosity of the electrode 14, there is a greater flow resistance within the electrode 14 away from the channels 42 in comparison to the channels 42. The electrolyte 26 is therefore particularly mobile and able to be conveyed by way of the channels 42. The channels 42 are in this case designed such that the electrolyte 26 is conveyed through the channels 42 in a corresponding proportion, which may be defined by the design of the channels 42, and thus a respective definable proportion is able to reach the respective active zone or the respective at least one reaction surface of the electrode 14. A significantly lower flow resistance in the electrode 14 is thereby able to be achieved through the guide structure 16 without significantly reducing the active surface or the reaction surfaces for part of the redox reaction in the electrode 14.

By virtue of the substantially parallel alignment of the channels with respect to one another in the guide structure, the electrolyte 26 is able to be conveyed. In order to obtain a flow that is as uniform as possible of the electrolyte 26 through the electrodes 14, adjacent channels 42 may be arranged at the same distance from one another. As shown in FIG. 5, one channel 42 is in each case alternately open toward the upper end of the figure and the adjacent channel 42 next to it is open toward the lower edge of the plane of the image in FIG. 5, such that the channels 42 are arranged in a kind of toothing, wherein the distance 44 in each case remains the same between adjacent channels 42 and the channels 42 each have the same diameter or cross-sectional area 46. The diameter of a channel 42 may have a width or a diameter of 1 to 3 millimeters, wherein a diameter of up to 5 millimeters or more may also be implemented, for example.

FIG. 6 shows a schematic illustration of a fifth electrode element 12 having the channels 42. In this case, adjacent channels 42 each have a different cross-sectional area 46, wherein the cross-sectional area 46 of adjacent channels 42 are in a predefinable ratio with respect to one another. The distance 44 between respectively adjacent channels 42 is furthermore selected such that it increases in a preferred direction 48 of the electrode 14.

FIG. 7 shows a schematic illustration of a sixth electrode element 12 having channels 42 with different cross-sectional areas 46. The respective cross-sectional area 46 of a respective channel 42, which is perpendicular to the direction of longitudinal extent 50 of the channel 42, is designed, along the direction of longitudinal extent 50, such that its size varies, in particular continuously, along the direction of longitudinal extent. As an alternative, at least one shaped element 52 is arranged on a channel wall 54, such that the cross-sectional area 46 is reduced or increased at least in a certain subregion of the channel 42. The arrangement of the respective shaped element 52, which may be formed for example as a concave or convex bulge or indentation, may function for example as a pressure reducer in the respective channel 42.

Figure 8:
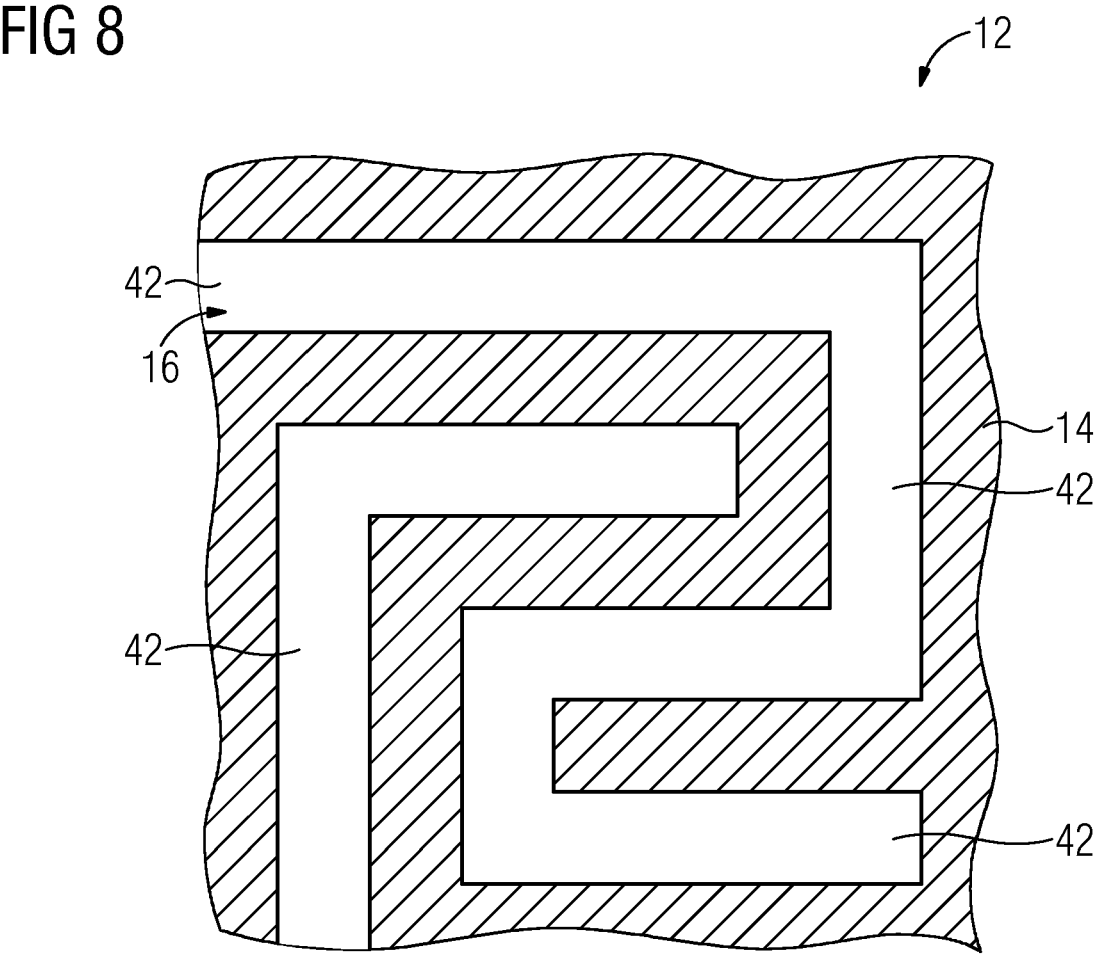
FIG. 8 shows a schematic illustration of a seventh electrode element incorporating teachings of the present disclosure having channels arranged in a meandering manner.

FIG. 8 shows a schematic illustration of a seventh electrode element 12 having channels 42 arranged in a meandering manner. A plurality of channels 42 may be arranged in a meandering manner with respect to one another and at least partially connected directly to one another, in particular in a fluidically or electrolytically conductive manner. In summary, the channel 42 or an arrangement consisting of a plurality of channels 42 may be designed such that channel widths of adjacent channels 42 have a fixed ratio of for example 1 to 2 to 3, wherein a second channel 42 adjacent to a first channel 42 is formed in each case under an adjacent channel 42 and no third channel 42 is arranged between the first channel 42 and the second channel 42.

By virtue of using said diffuser, a distribution of the electrolyte 26 may be distributed differently over a plurality of channels 42. Thus, for example, a distribution of the electrolyte 26 in the case of 1 to 2 to 3 may be implemented or a flow increase of 30% per channel 42 may for example be achieved from the inside, that is to say a subregion that is arranged closer to the membrane 20 of the electrolyte 26, towards an outer, that is to say further away from the membrane 20, subregion of the electrode 14. The guide structure 16, which is integrated in the electrode 14 of the electrode element 12, may thus be designed such that a respective flow direction in the electrode 14 of the electrolyte 26 is independent of a location in the interior 28 of the half-cell 22, such that any location within the respective interior 28 of the cell 18 or the respective half-cell 22 is able to be flowed through by an equal volume flow of the electrolyte 26.

The illustrated embodiments of the guide structure 16 of the electrode element 12 may for example reduce the hydrodynamic resistance within the electrode 14 by up to a factor of 10. The respective cross-sectional area 46 of the respective channel 42 may for example be varied by up to 30% per channel 42, such that, from the outside inward or from the location where the electrolyte 26 flows into the half-cell 22 to the location from which the electrolyte 26 flows out of the half-cell 22, the surface increase by up to 30% or a value of 0 to 30% in the change in the cross-sectional area 46 may be used. The surface increase or surface decrease may also be greater than 30%.

Figure 9:
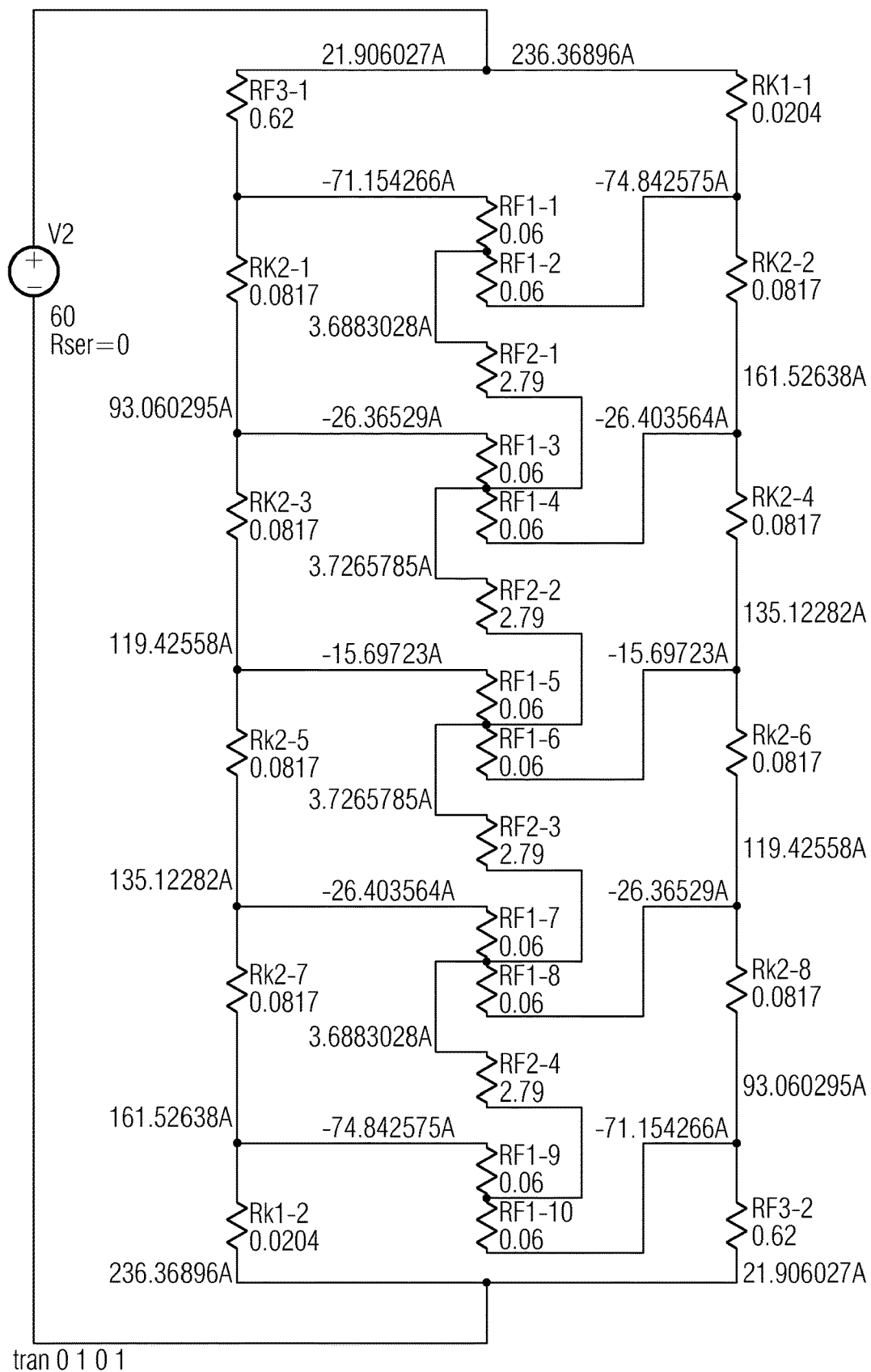
FIG. 9 shows a schematic illustration of a circuit diagram of a resistance calculation for simulating an electrolyte flow through a half-cell of the redox flow battery incorporating teachings of the present disclosure.

FIG. 9 shows a schematic illustration of a circuit diagram 56 for a resistance calculation for simulating a flow of electrolyte through a half-cell 22 of the redox flow battery 10. The embodiments of the guide structure 16 that are shown in the figures and their advantages were able to be checked through simulation calculations. To this end, a derivative of the SPICE program was used for the calculation. In the simulation model, the voltage V corresponds to the pump power, which represents the flow of the electrolyte 26 through the cell 18. The current intensity I in the simulation model corresponds to the material flow, that is to say the actual amount of the electrolyte 26 that is conveyed through the cell 18 through a specific area or flow volume.

What is claimed is:

1. A redox flow battery comprising:
A cell divided into half-cells by a membrane;
wherein each half-cell comprises a current collector and an electrode element arranged in an interior of the respective half-cell;
an electrolyte able to flow through the interior of the respective half-cell;
an electrode; and
a guide structure for guiding the electrolyte integrated into and defined by the associated electrode, wherein the guide structure includes multiple regions defined by different densities among the multiple regions and at least one of the multiple regions is defined by stitches in the guide structure.

2. The redox flow battery as claimed in claim 1, wherein the electrode comprises a nonwoven and/or foam and/or mesh and/or braid and/or sponge.

3. The redox flow battery as claimed in claim 1, wherein, by virtue of a shaped structure of the current collector in contact with the electrode, the density regions in the electrode are embossed by way of the shaped structure.

4. The redox flow battery as claimed in claim 1, wherein the guide structure comprises a channel with an angular and/or round cross section.

5. The redox flow battery as claimed in claim 4, wherein a cross-sectional area of the channel measured perpendicular to a direction of longitudinal extent of the channel changes.

6. The redox flow battery as claimed in claim 4, wherein a boundary surface of the channel is at least partially congruent with a subregion of a surface of the electrode.

7. The redox flow battery as claimed in claim 4, wherein the guide structure comprises a plurality of channels aligned substantially parallel to one another.

8. The redox flow battery as claimed in claim 7, wherein adjacent channels each have a different cross-sectional area.

9. The redox flow battery as claimed in claim 7, wherein adjacent channels are each arranged at a single distance from one another.

10. The redox flow battery as claimed in claim 7, wherein a distance between respective adjacent channels increases or decreases in a first direction of the electrode.

11. The redox flow battery as claimed in claim 4, wherein a plurality of channels meander with respect to one another and are at least partially connected directly to one another.

12. The redox flow battery as claimed in claim 1, wherein the guide structure includes a diffuser channelling the electrolyte to or from the electrode.

13. A redox flow battery comprising:
a cell divided into half-cells by a membrane;
wherein each half-cell comprises a current collector and an electrode element arranged in an interior of the respective half-cell;
an electrolyte able to flow through the interior of the respective half-cell;
an electrode; and
a guide structure for guiding the electrolyte integrated into and defined by the associated electrode, wherein the guide structure includes multiple regions defined by different densities among the multiple regions;
wherein, by virtue of a shaped structure of the current collector in contact with the electrode, the density regions in the electrode are embossed by way of the shaped structure.

14. The redox flow battery as claimed in claim 13, wherein the electrode comprises a nonwoven and/or foam and/or mesh and/or braid and/or sponge.

15. The redox flow battery as claimed in claim 13, wherein the guide structure comprises a channel with an angular and/or round cross section.

16. The redox flow battery as claimed in claim 15, wherein a cross-sectional area of the channel measured perpendicular to a direction of longitudinal extent of the channel changes.

17. The redox flow battery as claimed in claim 15, wherein a boundary surface of the channel is at least partially congruent with a subregion of a surface of the electrode.

18. The redox flow battery as claimed in claim 15, wherein the guide structure comprises a plurality of channels aligned substantially parallel to one another.

19. The redox flow battery as claimed in claim 18, wherein adjacent channels each have a different cross-sectional area.

20. The redox flow battery as claimed in claim 18, wherein adjacent channels are each arranged at a single distance from one another.

21. The redox flow battery as claimed in claim 18, wherein a distance between respective adjacent channels increases or decreases in a first direction of the electrode.

22. A method for producing a guide structure of an electrode element of a redox flow battery, the battery including an electrode, the method comprising: integrating the guide structure into the electrode with additive manufacturing the electrode; casting the electrode with inserts and then burning out the inserts; and/or pressing the guide structure into the electrode wherein the guide structure includes multiple regions defined by different densities among the multiple regions and at least one of the multiple regions is defined by stitches in the guide structure.

* * * * *